Feb. 18, 1936. H. F. HOBBS 2,031,414
POWER TRANSMISSION MECHANISM
Filed Dec. 31, 1934 4 Sheets-Sheet 1
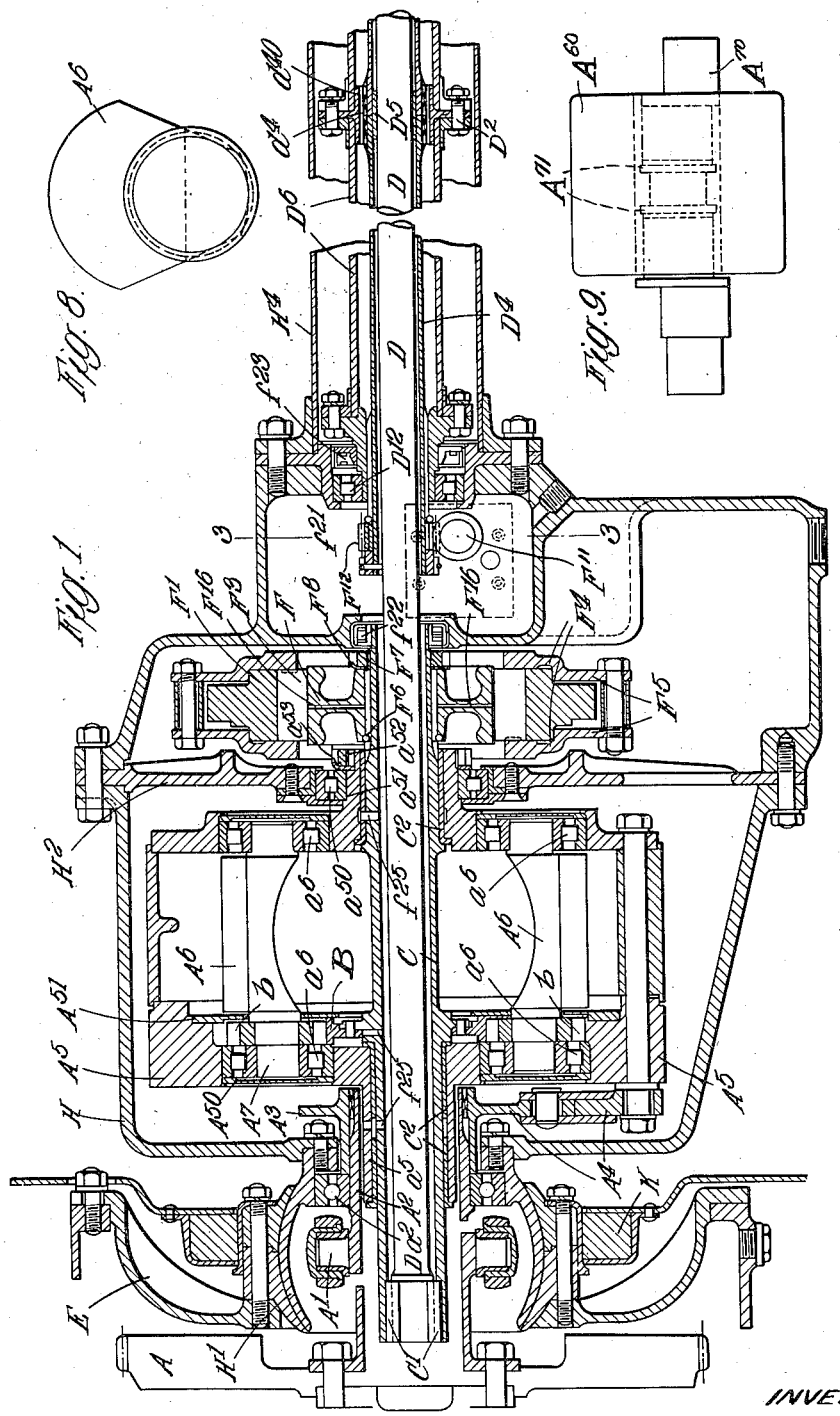
INVENTOR:
Howard Frederick Hobbs
Attorneys:
Haseltine Lake & Co.

Feb. 18, 1936.        H. F. HOBBS         2,031,414
POWER TRANSMISSION MECHANISM
Filed Dec. 31, 1934      4 Sheets-Sheet 2
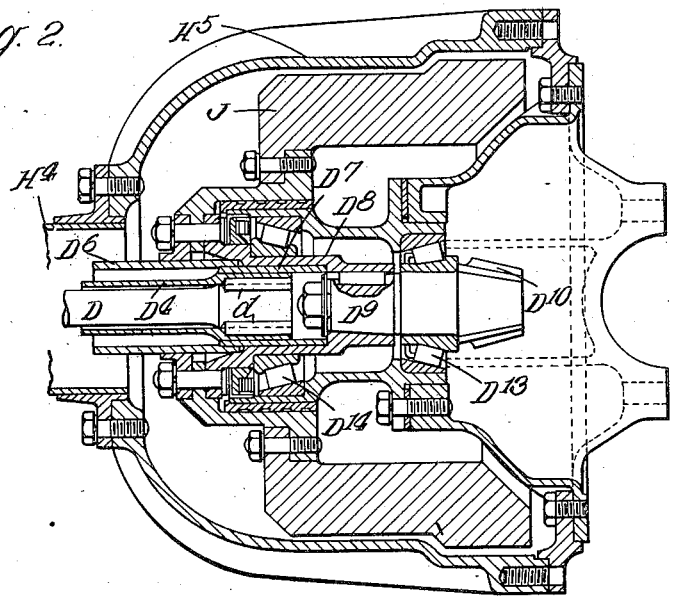
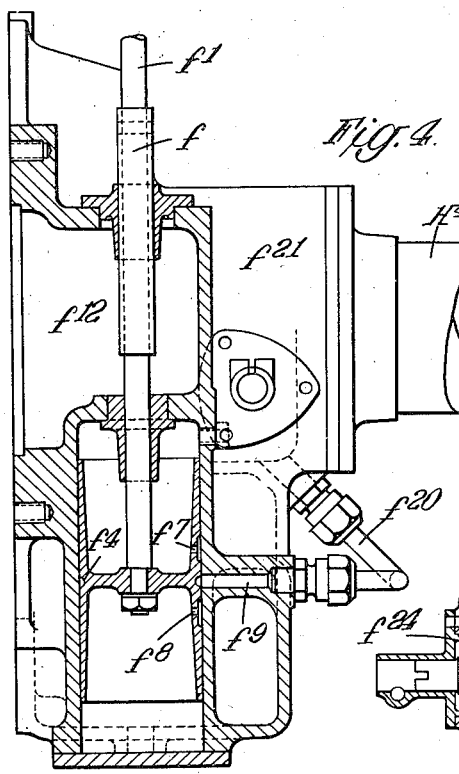
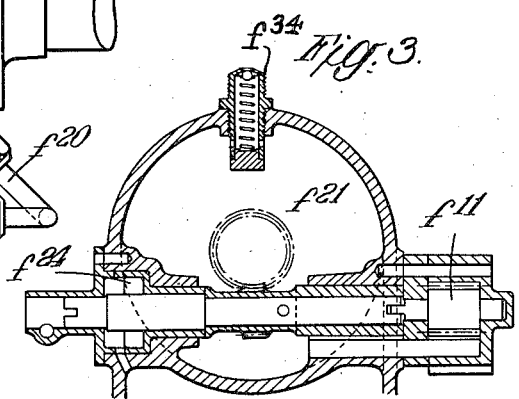
INVENTOR:
Howard Frederick Hobbs
Attorneys:
Haseltine Lake & Co.

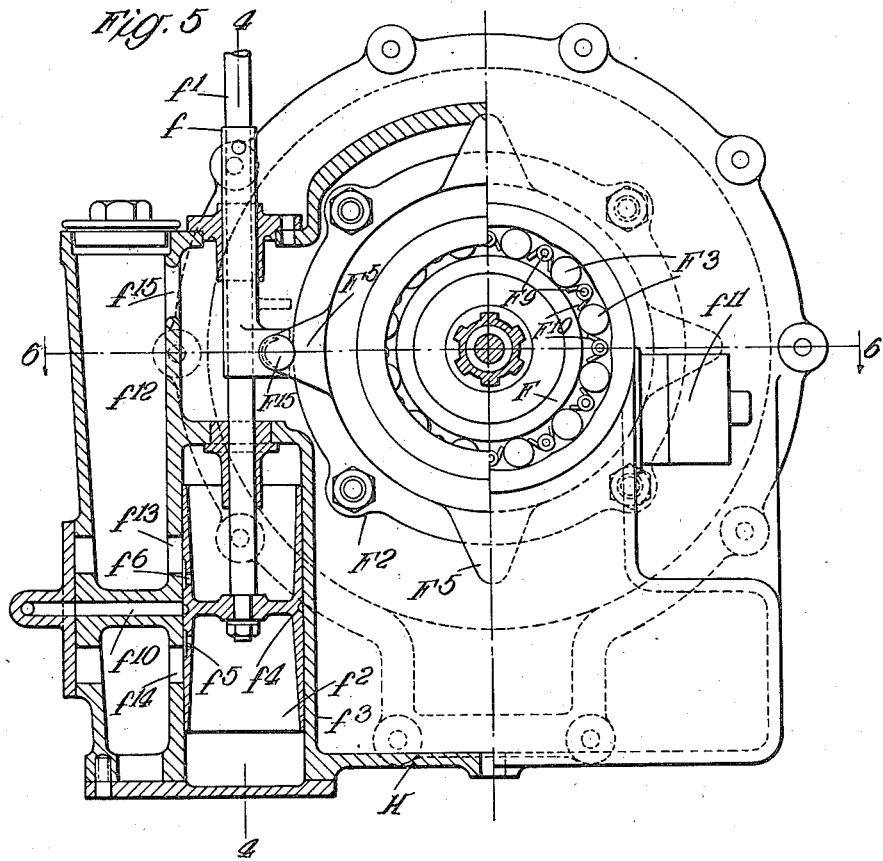
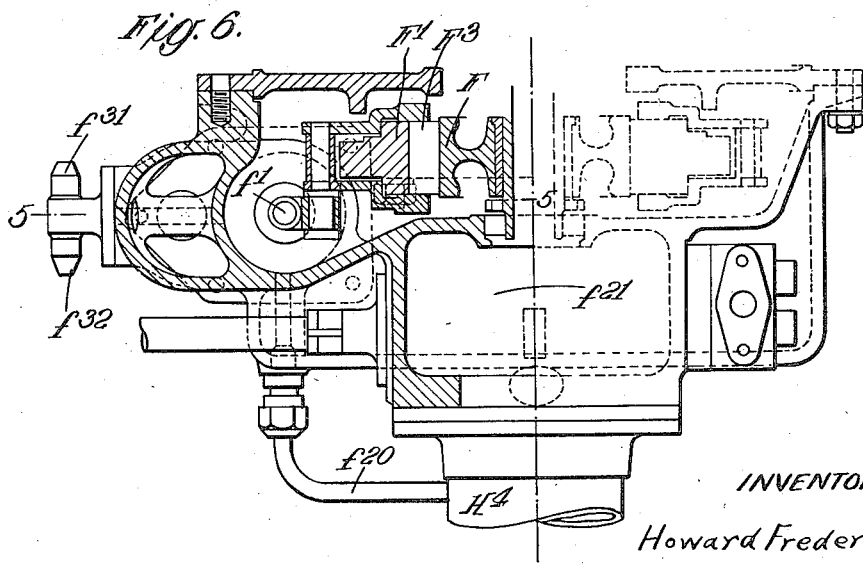

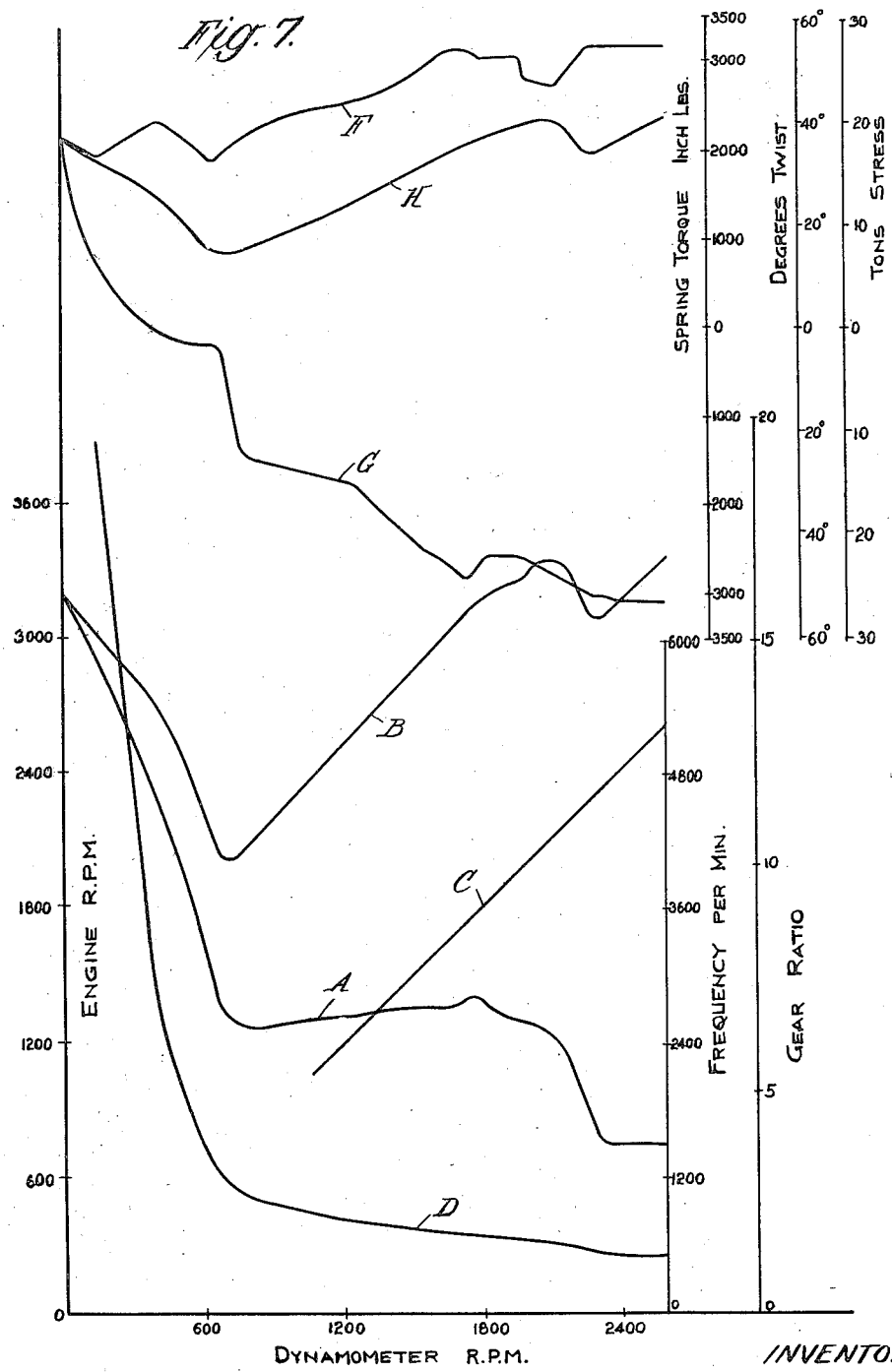

Patented Feb. 18, 1936

2,031,414

UNITED STATES PATENT OFFICE 2,031,414

POWER TRANSMISSION MECHANISM

Howard Frederick Hobbs, Leamington Spa, England

Application December 31, 1934, Serial No. 759,955
In Great Britain December 29, 1933

8 Claims. (Cl. 74—260)

This invention relates to power transmission mechanism of the kind disclosed in the specification of my prior British Patent No. 358,732 comprising at least one set of planetary weights carried by the engine crankshaft or other driver shaft, the weights being connected (preferably by planet pinion and a sun wheel) to an intermediate means which is prevented from rotating other than in the desired direction (preferably by a roller clutch) and which is connected to a driven member (e. g., the tail shaft of a motor propelled road vehicle) by a resilient device. The invention will hereinafter be described to facilitate explanation as applied to a gear having a single set of weights but I wish it to be understood that the invention is applicable to a gear having more than one set of weights. The term "tail shaft" hereinafter employed is intended to include any driven member such as the bevel pinion driving the differential bevel gear wheel.

While this gear has given satisfactory service I have during the course of numerous bench and road tests made certain discoveries which I have utilized by the present invention in providing a gear giving still better performance.

From various tests and graphs prepared from the results the following features of the gear have become evident:—

The operation of the gear may be divided into at least four distinct methods of operating which I will describe as "first phase", "second phase", "third phase" and "fourth phase". A relatively unimportant "fifth phase" will also be referred to.

The "first phase" of the gear comprises the period from the starting of the engine up to a slow driving or tail shaft speed in which the frequency of impulses from the weights is asynchronous with respect to the natural frequency of oscillation of the system comprising the weights, bearings, pinions, sun wheel, intermediate shaft, inner clutch member, and spring, as a whole. The impulses of the weights will however synchronize with the oscillations of said system at a higher frequency; the weights will force the system into the higher frequency of said impulses. In this first phase the engine speed may vary from nought to the maximum and the tail shaft speed may vary between nought and a fairly low driving speed. The action of the gear will be such that a positive or driving twist always exists on the spring shaft (i. e., the tail shaft does not overrun the spring shaft to provide a negative torque or twist in the opposite direction) and the sun wheel and intermediate means will be stationary momentarily during each rotation of the weights about the axes of the pinions and the inner clutch member will constantly oscillate first forwards and then backwards against the outer clutch member. The weights must be capable of forcing the oscillating parts into a frequency other than the natural frequency. This phase is probably not used more than about one per cent of the total driving period.

The "second phase" constitutes the major part of the driving period other than top gear (i. e. one-to-one gear or direct drive) and may be in the region of say 8 per cent of the total driving period. I have discovered that the gear has a very marked tendency to operate at the natural frequency of said system when each driving impulse of the weights synchronizes with the natural forward or positive direction of movement of the sun wheel. When this synchronization occurs or is nearly approached second phase will occur unless third or fourth phase is reached provided that the torque set up by the weights is sufficient to enable the amount of engine power being developed to be transmitted by the gear when at an engine speed giving the desired frequency.

In "first phase" engine speed increases as tail shaft speed decreases but during second phase tail shaft speed increases with increase of engine speed. Therefore as tail shaft speed decreases in second phase engine speed will decrease until maximum torque speed is reached: further decrease in tail shaft speed must not be accompanied by decrease in engine speed and therefore the gear must be arranged to go into first phase whereupon the engine speed can then increase rapidly with decrease in tail shaft speed.

"Third phase" can be produced at fairly high tail shaft speeds. In this phase the frequency of impulses from the weights is nearly down to half the natural frequency of oscillation of the system referred to so that the impulses still synchronize but the engine speed will be lower thus keeping engine speed within the desired limits. "Third phase" can be produced by decreasing engine speed quickly at high tail shaft speed.

The "fourth phase" comprises top gear or one-to-one ratio drive when the planetary weights remain in their driving positions and cease to rotate around the axes of the pinions.

A "fifth phase" is obtainable at very high speeds when the weights operate on one fourth of the frequency of the oscillating system. This phase is however comparatively unimportant as it only occurs well above normal speeds.

The period just prior to the gear entering "second phase" from "first phase" is of great importance as at this period the inertia of the intermediate means and parts affecting its inertia including the inner clutch member, the planetary weights, and the forward part of the resilient device, is at its maximum for "first phase" and this inertia counteracts the tendency of the weights to force these parts into the desired frequency (other than the natural frequency) or in other words tends to prevent the gear from reaching second phase.

If this inertia is sufficiently high the gear will not enter "second phase" (unless for example it is speeded up by some other agency such as by running down hill or is working under no load) and a point of no drive is reached which I term a "flat spot" effect.

For example, if a longitudinally arranged helical spring is provided in place of the spring shaft and is sufficiently large to take the load, stress, and frequency, the flat spot effect cannot be avoided.

If the inertia is low enough to avoid the flat spot effect it will still tend to produce roughness in transmission at this period. A gear as shown in Figures 1 to 8 of the drawings forming part of the specification of my said prior British patent will clearly avoid the flat spot trouble but some roughness has been experienced during the period referred to although this roughness is only momentary and does not often occur during actual driving.

An object of the present invention is to reduce or avoid the roughness referred to. Other important objects are to obtain better ranges of gear ratios and engine speeds with consequential improvement in efficiency and smoothness of transmission.

According to the invention the parts of the gear are all so constructed and arranged particularly as to the design of the weights and the frequency and inertia of the oscillating parts that (all parts of the transmission being strong enough to bear the maximum loads): (1) the engine and tailshaft speeds and ratios between them are in the desired ranges; (2) the inertial resistance of the oscillating system just prior to entering second phase is low enough (in relation to the total moment which the planetary weights can exert) to avoid roughness or to reduce roughness to a negligible amount; (3) the lowest top gear or fourth phase speed 900–2000 r. p. m. (preferably 1300–1700) under full torque and this speed is low enough to enable the total moment which the planetary weights can exert to be high enough in relation to said inertial resistance to avoid roughness just prior to entering second phase; (4) the lowest second phase tail shaft and engine speeds and the lowest top gear (fourth phase) speed are all so correlated as to avoid producing undesirably large change in engine speed or gear ratio on entering or leaving fourth phase; and (5) the lowest second phase engine speed (at full throttle) is about equal to maximum torque speed. Preferably the ratio between the pinions and sun wheel or equivalent is between 1:1.5 and 1:2.5; the natural frequency of the system comprising the resilient device, the intermediate means, and the parts affecting the frequency of said device and means is between 1700 and 3200 and preferably between 2300 and 3000; and the amount of inertia in lbs.,-inches$^2$ of the intermediate means together with parts affecting its inertia with respect to the axis of said means does not exceed a certain fraction of the maximum torque figure in ft.—lbs. which the planetary system will exert upon the intermediate means when rotated about it at its lowest direct drive speed, this fraction being 0.5 for a gear having a lowest direct drive speed at full torque of 1400 r. p. m. and having a gear ratio between the pinions and the sun wheel, or equivalent of about 1:2, and a natural frequency of 2900, and varying accordingly if this speed or ratio or frequency is different.

The desirable engine speeds vary with different engines but not greatly and for any particular engine the gear should maintain the engine speeds within the speed giving maximum torque and the speed giving maximum horse power. With a standard 7 H. P. engine these speeds are roughly 1,800 to 3,000 respectively but other engines are capable of higher speeds. The gear must be constructed so that the engine speeds will practically always be maintained approximately between maximum torque speed and maximum horse power speed. The gear will be arranged so that the lowest second phase engine speed (at full throttle) is about equal to maximum torque speed. This can be effected mainly by employing a suitable sun wheel and pinion ratio and a suitable spring shaft or other resilient device so as to give the required natural frequency of the oscillating system, and by designing the weights to give high torque with low inertia effect on the intermediate means. The frequency and inertia are balanced in relation to each other and to the engine so that the gear ratio varies in such a way as to maintain this range of engine speeds and to give the desired gear ratios at different speeds.

The necessary gear ratios can be determined empirically but for certain motor vehicles are fairly well known.

In second phase the frequency is equal to the product of the ratio between the sun and pinion wheels and the difference between the engine and tail shaft speeds. Given the sun and pinion ratio, it will be obvious that the range of gear ratios varies with the frequency. For example with a sun and pinion ratio of 2:1 (which is preferable for several reasons) and a low frequency of 1,000 the gear ratio at 1,000 tail shaft revolutions per minute is 1:1.5; at 1,500 revolutions, 1:1.33; and at 2,000 1:1.25; which ratios are too high and the corresponding engine speeds will be too low and the gear will tend to enter fourth phase when not desired. Conversely, a too high frequency will give too low gear ratios and too high engine speeds. Too high frequency will also produce an undesirably large difference of gear ratios when changing into or out of fourth phase and will tend to place too great a load and wear on the clutch. I have found that a frequency of 2300–3000 oscillations per minute is most suitable although in special circumstances a frequency of from 1700–2300 or even less or from 3000–3200 or even higher may be permissible.

I find that the sun wheel and pinion ratio should be from 1.5:1 to 2.5:1; a higher or lower ratio will produce undesirable gear ratios or too low or high frequency of the impulses of the weights. Preferably a 2:1 sun and pinion ratio is adopted as this also avoids wear on certain teeth where the direction of centrifugal torque is reversed and gives satisfactory frequency.

The planetary weights must be sufficiently heavy to transmit full engine torque at the lowest top gear speed required. Whilst it is theoretically better to change at maximum torque speed it is in practice better to change at a much lower speed. This lowest top gear (fourth phase) speed should be low enough to suit the convenience of the average driver requiring to maintain top gear when slowing down for instance in traffic and a speed of about 14–18 M. P. H. (or say 900 to 2000 (preferably 1300 to 1700) revolutions per minute of the tail shaft) at full throttle is usually suitable depending upon the type of vehicle or the user's requirements. This top gear or fourth phase lowest speed should not be too low (and the weights must not be too heavy) as this would prevent the gear from leaving fourth phase when desired. This speed must however be low enough to avoid producing undesirable high engine speed on leaving fourth phase. The size of the planetary weights may be designed within fairly close limits to provide the required fourth phase lowest speed. Variation of the size of the weights alters the natural frequency of the oscillating system although not greatly and has comparatively little effect on first, second or third phase performance.

As already described the inertia of the oscillating system must be as low as possible consistent with strength and the inertia difficulty is greatest just when entering second phase action since at this moment the inertial resistance of the oscillating parts against entering second phase is at a maximum. This inertial resistance is related to the total maximum moment of driving torque which all of the planetary weights can exert on the sun wheel. If this moment is increased (e. g. by using heavier weights) the inertia problem is easier but increasing this moment will reduce the lowest speed at full throttle or torque in fourth phase and other difficulties arise if this speed is too low. This speed must however be low enough to permit the said moment to be high enough to avoid roughness on entering second phase.

I have found that for a gear having a lowest top gear or "fourth phase" speed of 1400 R. P. M. at full torque and a ratio of 2:1 between the sun wheel and pinions and a natural frequency of 2900, the inertia of the parts in question should not exceed 0.5 in lbs.-inches$^2$ of the maximum torque figure in ft.-lbs. which the planetary system will exert upon the intermediate means when rotated about it at that speed. This inertia limit will vary accordingly for a gear having a different lowest direct drive speed but will probably in every case lie between 0.4 and 0.9. This inertia figure is inversely proportional to the square of this speed.

The permissible inertia of the oscillatory system varies with the torque capacity for which the gear is designed. The inertia must be low enough to enable the oscillating system to have the required frequency with a suitable spring and to ensure that the weights can force the oscillating system into substantial synchronization with their own frequency during "first phase" particularly at the period just before "second phase" is entered. A well known 7 H. P. engine develops about 22 ft.-lbs. torque and the permissible inertia of the oscillating system of a gear for this power and which has a lowest fourth phase speed at full throttle or torque of 1170 is about 13 lbs.-ins.$^2$ With an engine developing twice this torque it is permissible to employ a system having twice the inertia but this is not necessary as certain parts (e. g. bearings) do not require to be twice as heavy to carry twice the load, and it is therefore easier to keep within the permissible inertia limit with an engine of greater power. The permissible inertia of the oscillating system also depends on the natural frequency of this system, and on the ratio between the sun wheel and pinions which affects the frequency obtaining in first phase. If the natural frequency is increased the second phase action will commence at a lower tail shaft speed so that the maximum inertial resistance against entering second phase will be reduced but this frequency must not be too high or other difficulties arise. Also if the frequently in first phase is descreased said maximum inertial resistance is reduced but this frequency must not be reduced too much or other difficulties arise.

The lower the inertia the better will the gear function and the less difficulty will the design of a suitable spring shaft and other parts present. It is not feasible to reduce the inertia more than is desirable for the functioning of the gear since a certain inertia is necessitated by the strength and durability required for the various parts.

The inertia can be reduced to the required limits by making the parts concerned as small as permissible in weight and near to the axis of the gear, and by suitably designing the planetary weights. The weights may be fixed to their spindles and made at least twice as long as their diameter and preferably longer so that the centre of gravity is as near as possible to the axis of the associated pinion and the mass of the weight is concentrated or as close as possible to an axis through its centre of gravity. The result of this is to reduce the inertia of the weight about its centre of gravity and about the axis of the pinion without reducing its torque about the axis of the pinion. The length of the weight is preferably three times or more as great as its greatest distance from the pinion axis. The length will be limited mainly by the overall length reasonably permissible for the mechanism. The cross-sectional shape of the weight may be circular and the axis of the pinion may be on or near its circumference. The weight may, however, be reduced in size on one side adjacent to the axis or built up in places for strength. Alternatively, each of the weights is mounted directly and freely on a cylindrical bearing which is disposed eccentrically in relation to the axis of the associated pinion. The result of this is that, the centrifugal force remaining the same, the inertia of the weight will be reduced because it will not tend to make any rapid change in speed of rotation about its centre of gravity or normal centre of rotation. The inertia of the weight may be regarded in two ways, i. e. in relation to the rotation of its centre of gravity about the axis of the pinion and in relation to the rotation of the weight about its centre of gravity. The inertia of the weight about the other centre is considerably reduced. Further owing to the great reduction in the inertia about its centre of gravity the other inertia can be relatively decreased by an increase in size of the weight whereas if the inertia about its centre of gravity were not eliminated or greatly reduced such increase in size would not result in an advantage as far as inertia is concerned.

The lowest tail shaft speed at which the gear can enter second phase is determined largely by the frequency of the oscillating system referred to, and can also be varied by other means such as the weight of the planetary masses and the inertia of the oscillating system. This lowest speed should be arranged to be as low as possible without falling below or much below maximum torque speed so that inertia is as low as possible when entering "second phase". The lowest second phase tail shaft and engine speeds and the lowest top gear or fourth phase speed, must all be correlated to each other (without upsetting the other features of the invention) in such a manner that an undesirably large change in engine speed or gear ratio will not occur on entering or leaving top gear or fourth phase. These lowest speeds are mainly controlled by the size and disposition of the planetary weights, and the said natural frequency, but these factors in turn are controlled mainly by the maximum permissible inertia figure.

The maximum inertia figure can also be deduced from the natural frequency. If the natural frequency of a resilient weighted system is known, the inertia can be deduced from known formulæ relating frequency to inertia and spring stiffness.

The resilient device preferably comprises one or more spring shafts each of which (1) is twisted about an axis passing longitudinally therethrough; (2) has its mass arranged sufficiently close to the axis as to reduce the inertia to the required figure; (3) is capable of enabling a natural frequency of the oscillating system of from 2,000 to 2,800 (or in special cases) 1,600 to 3,200 to be produced; (4) is made of suitably flexible steel; and (5) is capable of flexing 50–70° each way according to the frequency without reaching the fatigue limit of the steel.

For characteristics (2) and (3) it will be apparent from the preceding explanation what inertia is permissible.

With regard to the characteristic (4) an alloy steel should be used for the shaft having a high resistance to fatigue when subjected to reversed torsional stresses. For example, a nickel chrome molybdenum steel heat treated to give an ultimate strength of 90–100 tons per sq. inch. A chrome vanadium steel has also given good results.

For the purpose of the characteristic (5) the stress should preferably be maintained within about 20 tons per square inch and the spring must withstand the rapid reversals of stress to which it will be subjected for at least the normal life required for the parts of the gear. The spring must be long enough to reduce the stress to within the required limits without increasing the inertia too much. The shaft must be of the necessary stiffness to produce the desired frequency. The frequency chosen for the oscillating system will determine the maximum amplitude of twist of the spring shaft. A frequency of 2000 per minute will require up to about 70° maximum twist each way whereas a frequency of 2800 would require only about 50°–55°. A frequency of 2400 requires about 60° twist.

The twisting moment, stress, size, maximum deflection, and elastic modulus, are related by known formulæ.

In order that the said invention may be clearly understood and readily carried into effect the same will now be described more fully with reference to the accompanying drawings in which:—

Figure 1 is a central section of the main part of a gear made in accordance with the invention;

Figure 2 is a central section of the rear end of the gear shown in Figure 1;

Figures 3, 4, 5 and 6 are sections on the lines 3—3, 5—5, 6—6 on Figures 1, 5, 6 and 5, respectively;

Figure 7 illustrates graphically the results of certain tests carried out with a different design of gear also made in accordance with the invention;

Figure 8 is an end view of one of the planetary weights shown in Figure 1; and

Figure 9 illustrates a different design of planetary weight.

In Figure 1, A is the flywheel attached to the engine crank shaft and connected by universal joint $A^1$ to a short tubular shaft $A^2$ splined to a disc or spider $A^3$ linked by four pairs of links $A^4$ to the casing $A^5$ in which four planetary weights $A^6$ comprising a single set of weights are rotatably mounted on cranked spindles $A^7$ carried in roller bearings $a^6$ in the casing $A^5$. Each weight $A^6$ is shaped as shown in Figures 1 and 8. The weights are of long shape in relation to their distance from the axis of the spindles $A^7$. The casing $A^5$ is held in position axially by engagement of the bearing races of bearings $a^{50}$ between a shoulder $a^{51}$ on the casing on one side and a nut $a^{52}$ and lock washer $a^{53}$ on the other side. Each weight is geared by a pinion $b$ to the sun wheel B that is attached to the tubular intermediate shaft C. The weights and pinions are enclosed in an oil chamber formed in the casing $A^5$ by partitions $A^{50}$ and $A^{51}$. The tubular intermediate shaft extends forwardly of the sun wheel into proximity with the flywheel A. Located within and attached to the front end of the intermediate shaft is the solid spring shaft D of circular cross-section. The spring shaft D has a force fit in the front end of the intermediate shaft and is held against rotary movement within the intermediate shaft at the front end by pins $C^1$. The shaft $A^2$ runs in bearings $a^2$ and a tubular extension $a^5$ of the casing $A^5$ runs between a Babbitt metal bearing outside and plain bearings $C^2$ inside. The other side of the casing runs between bearings $a^{50}$ outside and plain bearings $C^2$ inside. The outer casing H has a frusto-spherical joint $H^1$ with the engine casing E. Splined to the intermediate shaft C is the inner annular member F of a reversible roller clutch the outer annular member or race $F^1$ of which is provided with radially extending lugs $F^2$ (Figure 5) bolted to a plate $H^2$ comprising part of the outer casing H. The inner member has oil holes $F^{16}$. The outer race $F^1$ is provided with curvatures in the usual way. Between each pair of the rollers $F^3$ is a pin $F^9$ carrying two pivoted plates $F^{10}$ one of which engages one of the adjacent pair of rollers and the other of which engages the other of the adjacent pair of rollers. A coil spring (not shown) surrounding the pin presses the plates apart and thus the rollers also. The pins referred to are mounted in two plates $F^4$ provided with lugs $F^5$ bolted together. The inner clutch member or race F is positioned between a spring ring $F^6$ on one side and a nut $F^7$ and lock washer $F^8$ on the other side. One of the lugs $F^5$ is attached by pin and slot connection $F^{15}$ to a sleeve $f$ fixed to a piston rod $f^1$ that carries a piston $f^2$ operating in a cylinder $f^3$ formed in the outer casing H. The piston $f^2$ has an annular groove $f^4$ in its outer surface midway between the ends of the piston and on each side of this groove are two inlet ports $f^5$, $f^6$ (for forward and reverse drive respectively) leading to opposite sides of the piston. Also on opposite sides of the groove $f^4$ are outlet ports $f^7$, $f^8$ (see Figure 4). In the mid-position of the piston $f^2$ oil under pressure enters from an inlet port $f^{10}$ and passes through the groove $f^4$ to an outlet port $f^9$. Displacement of the piston to one side or the other will enable oil from $f^{10}$ to enter the cylinder on one side or the other of the piston through the ports $f^5$ or $f^6$ and to move or press the piston $f^2$ whereby the pressure on the rollers is increased or decreased, the oil leaving through the port $f^7$ or $f^8$. The port $f^{10}$ leads to two nipples $f^{31}$ and $f^{32}$, the former of which leads to a pump (not shown) driven by connection to the engine and the other of which ($f^{32}$) leads to a pump $f^{11}$ driven by connection to the spring shaft through a worm $F^{11}$ and worm wheel $F^{12}$. The pump $f^{11}$ removes oil from the nipple $f^{32}$ while the pump, not shown, supplies oil to the nipple $f^{31}$. The pressure of the oil entering through the port $f^{10}$ is thus equal to the difference in pressure of oil from the two pumps. An oil reservoir $f^{12}$ is provided adjacent to the cylinder $f^3$ and has ports $f^{13}$, $f^{14}$, communicating with the cylinder to maintain the cylinder filled and to permit escape of oil from the cylinder when necessary. Another outlet port $f^{15}$ in the reservoir $f^{12}$ at the upper end thereof and above the cylinder $f^3$ is provided for the purpose of supplying oil to the gear generally. The cylinder $f^3$ may have an air escape for use when the cylinder is being filled initially. The rod $f^1$ is provided with a hand operated control (not shown) which is provided with a certain slackness. The hand control is used for placing one of the ports $f^5$ or $f^6$ into communication with $f^{10}$ on starting for forward or reverse running. Oil escaping through the outlet port $f^9$ passes through a pipe $f^{20}$ into a chamber $f^{21}$ surrounding the spring shaft at the part where the shaft leaves the roller clutch rearwardly. The chamber $f^{21}$ also receives oil leaving the pump $f^{11}$. A relief valve $f^{34}$ in the chamber $f^{21}$ is connected to the nipple $f^{31}$. The chamber $f^{21}$ has two "Gits" oil seals $f^{22}$, $f^{23}$, thereby leaving an outlet for the oil from the chamber $f^{21}$ into the interior of the intermediate shaft on one side and to a less extent by leakage through bearings for lubricating certain parts hereinafter to be described. The oil leaves the interior of the intermediate shaft through various lubricating holes $f^{25}$ for lubricating various parts of the gear. An oil seal may also be situated between the engine casing E and the flywheel A.

The spring shaft D is fixed at its rear end by force fit and pins $D^2$ to a flexible tubular shaft $D^4$, made in sections attached together at intervals by sleeves $d^4$ to which the adjacent ends of the sections are splined. The adjacent ends of the sections also run on split bearing sleeves $D^5$. The sleeves $d^4$ run in bearings $d^{40}$ carried by an outer rigid tube $D^6$. The front end of the flexible tube $D^4$ is splined to the front end of the rigid tube $D^6$. The rear end of the flexible tube $D^4$ runs in a bearing collar $D^7$ carried by the tubular extension $D^8$ of the rigid tube $D^6$. The tubular extension $D^8$ carries a stub shaft $D^9$ on which a bevel pinion $D^{10}$ operating the differential gear is mounted. The rigid tube $D^6$ runs between a bearing $D^{12}$ at its forward end and two bearings $D^{13}$, $D^{14}$ at its rear end. A fly wheel J is attached to the rear end of the rigid tube $D^6$. The spring shaft D may also if desired be made in two or more sections joined together in a manner similar to that described with reference to the sections of the flexible tube $D^4$.

The casing H is rigidly attached to the differential housing $H^5$ by a torque tube $H^4$ that surrounds the parts D, $D^4$, $D^6$. The weight and stiffness of the tube $H^4$ and casing H are arranged so that they have a natural frequency of vibration different from the frequencies of the gear itself.

Figure 9 illustrates a different type of planetary weight comprising a ring $A^{60}$ having an internal circular bearing surface. A spindle $A^{70}$ carrying the ring has shoulders $A^{71}$ to locate needle bearings that are inserted between the ring and the spindle. This weight as it is free to rotate about its spindle (wherein it differs from the weight shown in Figure 1) will not tend to make any rapid change in speed of rotation about its centre of gravity or normal centre of rotation. The inertia effect of these weights on the oscillating system will therefore be considerably reduced.

The rear end of the engine casing is mounted on an annular rubber support E.

The length of the spring shaft D is about 69.5 inches and the diameter of the inner member of the roller clutch is 3.806 inches.

Figure 7 illustrates graphically the results of certain bench tests carried out with a well known type of standard 7 H. P. engine.

The parts of the curves from 0 to 700 dynamometer (tailshaft) R. P. M. represent first phase action. Second phase action is from 700 to about 2,100 and the frequency (see curve A) remains at about 2,700 over this second phase. At about 2,500 the frequency drops to about half the phase two frequency. The graphs may not be precisely accurate due to the fact that more precise recording instruments were not available. Curve B shows the steady increase in engine R. P. M. during phase two; the required reduction of engine speed on entering phase three. Curve C shows the direct drive which in that particular gear could be entered at any time above about 1,140 tailshaft R. P. M. Curve D shows the even variation of gear ratio. It will be observed that the curve C should not be low enough to permit change into or out of direct drive (fourth phase) on the steep part of the gear ratio curve, and the lowest engine and tail shaft speed on curve B must be so arranged with respect to the lowest speed on curve C that on changing into or out direct drive there will not occur a too large change in engine speed or gear ratio. Curves F and G show the increasing spring amplitude and torque in phase two and absence of negative torque in phase one. Curve H illustrates maximum weight torque.

What I claim and desire to secure by Letters Patent of the United States is:—

1. Automatically variable power transmission comprising a driving shaft, a driven element, a rotatable member, means connecting said member to said element, means to prevent rotation of said member in one direction, a plurality of rotatable elements comprising cranks associated with said driving shaft, a set of planetary weights carried on said rotatable elements, and means operatively connecting said rotatable elements to said rotatable member.

2. Automatically variable power transmission according to claim 1, said rotatable elements each having a cylindrical bearing arranged eccentrically to the axis of rotation, said weights being rotatably mounted on said bearings.

3. Automatically variable power transmission comprising a driving shaft, a driven element, a rotatable member, means connecting said member to said element, means to prevent rotation of said member in one direction, a plurality of rotatable elements comprising cranks associated with said driving shaft, a set of planetary weights carried on said rotatable elements, and means consisting of a sun gear on said rotatable member and pinions on said rotatable elements having a ratio of 2:1 for operatively connecting said rotatable elements to said rotatable member.

4. Automatically variable power transmission comprising a driving shaft, a driven element, a rotatable member, a casing upon said rotatable member, means connecting said member to said element, means to prevent rotation of said member in one direction, a plurality of rotatable elements comprising cranks disposed within said casing, a set of planetary weights carried on said rotatable elements, means operatively connecting said rotatable elements to said rotatable member and a set of links connecting said casing to said driving shaft.

5. Automatically variable power transmission gear of the planetary weights type, wherein a roller detent device serves to prevent transmission of impulses in an undesired direction, including a prime mover and an output shaft, means driven by said prime mover and means driven by said output shaft for production of a fluid pressure differential proportional to the speed differential of said prime mover and said output shaft and means movable by said fluid pressure connected to said detent device, said means being effective to apply said pressure to the rollers to press said rollers more firmly into gripping engagement when said difference in speeds is great and less firmly as top gear of the transmission gear is approached.

6. Automatically variable power transmission gear according to claim 5, said means driven by said prime mover consisting of a fluid pump and said means driven by said output shaft consisting of a second fluid pump of substantially the same capacity as said first pump.

7. Automatically variable power transmission gear of the planetary weights type wherein a roller detent device is disposed within a movable cage and serves to prevent transmission of impulses in an undesired direction, including a prime mover and an output shaft, a fluid pressure pump driven by the prime mover and a second fluid pressure pump of substantially the same capacity as said first pump driven by the output shaft, said pumps being connected whereby a fluid pressure differential proportional to the speed differential of said prime mover and said output shaft is produced, a piston connected to said cage, a fluid pressure duct between said pumps and said piston, a plurality of springs upon said cage and bearing against said rollers, the pressure applied upon said rollers by said springs being proportional to the fluid pressure differential.

8. Automatically variable power transmission of the type including at least one set of planetary weights carried by a driver shaft, the weights being associated with and connected to a rotatable intermediate means connected to a driven member, and means for preventing rotation of said intermediate means in any other than the desired direction, including movable means having a movement proportional to the speed of the prime mover driving said transmission mechanism, a roller and cage detent device preventing the transmission of impulses in an undesired direction, a fluid pump driven from the input end of the transmission mechanism, a second pump of substantially the same capacity as said first pump and driven from the output end of said transmission mechanism so as to exhaust said first pump in order to utilize the difference of fluid pressure thus created for applying the varying pressure to the rollers of said roller detent device, and a piston connected to said movable detent cage carrying springs which are pressed against said rollers, the fluid under said pressure difference being led to and communicating with said piston.

HOWARD FREDERICK HOBBS.